2,944,052
NOVEL EPOXY PREGNANES

Percy L. Julian, Oak Park, and Arthur Magnani, Wilmette, Ill., assignors to The Julian Laboratories, Inc., Franklin Park, Ill., a corporation of Illinois No Drawing. Filed June 26, 1957, Ser. No. 668,025

7 Claims. (Cl. 260—239.55)

This invention relates to new and valuable 11,12-epoxypregnane derivatives. This invention also relates to novel processes for the preparation of these compounds.

The compounds of this invention have central nervous system depressant activity. This activity makes them valuable as sedatives or general anesthetics for humans. They are also useful as sedatives and anesthetics for animals, for example, as anesthetics for laboratory manipulation of experimental animals, such as mice and rats. The central nervous system activity is all the more useful because it is accompanied by substantially few side reactions resulting from the endocrinal or other actions usually associated with 3,20-dioxygenated steroids, even at relatively large dosage.

The active steroids of this invention are represented by the following general formula:

FORMULA I

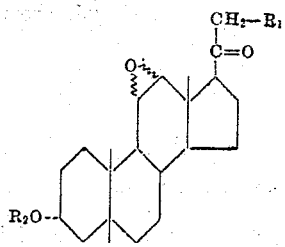

when $R_1$ represents hydrogen, hydroxyl or acyloxy; $R_2$ represents hydrogen or acyl; and "⌇" represents an $\alpha$ or $\beta$ bond.

More specifically, the compounds of this invention are represented by Formula I when:

$R_1$ represents hydrogen, hydroxyl, acyloxy, preferably alkanoyloxy of 2 to 6 carbons, $\omega$-carboxyalkanoyloxy preferably of 4 to 6 carbons, advantageously hemisuccinyloxy, nontoxic metallic salts, preferably alkali metal salts, and ammonium salts of $\omega$-carboxyalkanoyloxy moieties of preferably 4 to 6 carbons or aroyloxy, preferably of 7 to 8 carbons, such as benzoyloxy and toluoyloxy.

$R_2$ represents hydrogen or acyl such as alkanoyl, preferably of from 2 to 6 carbons, aroyl preferably of 7 to 8 carbons, such as benzoyl and toluoyl, $\omega$-carboxyalkanoyl preferably of from 4 to 6 carbons, advantageously hemisuccinyl, or nontoxic metallic salts of such hemiesters, preferably alkali metal salts, and ammonium salts.

"⌇" represent an $\alpha$ or $\beta$ bond.

The compounds of Formula I when $R_2$ is H and $R_1$ is H or acyloxy are disclosed in our copending application, Serial No. 647, 465, filed March 21, 1957.

Advantageous compounds are represented by the general formula:

FORMULA II

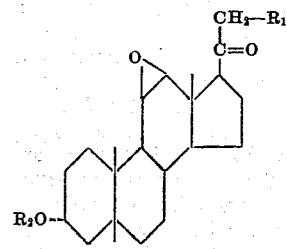

when $R_1$ represents hydrogen, hydroxy, hemisuccinyloxy, acetoxy or sodiohemisuccinyloxy.

$R_2$ represents hydrogen, acetate, hemisuccinyl or sodiohemisuccinyl.

Preferred compounds are represented by Formula II when $R_1$ represents hydrogen, hydroxy, hemisuccinyloxy, acetoxy or sodiohemisuccinyloxy; and $R_2$ represents hydrogen.

When soluble sedative agents are desired, for instance for intravenous anesthesiology, alkali metal salts of the hemidibasic esters, such as the sodium or potassium salts of either mono- or dihemisuccinyl esters, are preferred. Such compounds are those in which either one or both of the $3\alpha$ or 21-hydroxyl groups are esterified.

The $3\alpha$-ol compounds of this invention are advantageously prepared by another aspect of this invention, namely by selective reduction of the 3-keto analogues. The starting materials for this reduction are 11,12-epoxypregnane-3,20-diones which may or may not be substituted in the 21-position with a hydroxy or acyloxy group. The preparation of the starting materials are described in our copending application Serial Number 647,465, filed March 21, 1957. Selective reduction of the 3-one moiety is a generally useful process which can be applied generally to steroids with a $5\beta$-H-pregnane nucleus which has an 11,12-epoxy substituent. Other permitted variations are $\Delta^{1,2}$ or $\Delta^{16,17}$ unsaturation as well as lower alkyl substituents at positions 2 or 6. These alternative starting materials are in addition to those which form the compounds of this invention as mentioned above.

The preferred reducing agent is sodium borohydride but other bimetallic hydrides are acceptable, for example potassium borohydride or lithium aluminum hydride. The selectivity of the reaction is largely controlled by the proportion of reducing agent. Preferably, about the stoichiometric amount of reducing agent is used. Excesses of up to three times this quantity of reducing agent or more may be conveniently utilized if the temperature and duration of the reaction are controlled.

The reaction can be run at from about 0° C. to about 100° C. for from several minutes to about six to eight hours. Preferably, the reaction is run to completion at ambient temperature, i.e., from about 20° C. to about 40° C. for about one-half to one hour. If an excess of reducing agent is used, the temperature and length of reaction time are limited to confine the reduction to the more easily reduced 3-keto moiety.

The solvent for the reduction is selected from a wide range of solvents, depending largely on the bimetallic hydride employed. For instance, the preferred borohydride is stable in aqueous solvents, therefore, the reaction media for this reagent are aqueous-miscible solvents which are inert to reduction by the reagents, for example, aqueous-alcoholic mixtures, ethanol, isopropanol, tert. butyl alcohol or preferably aqueous methanol. Other reducing agents are sensitive to water, for instance lithium aluminum hydride, and are used in anhydrous organic media resistant to reduction, such as ethyl ether, tetrahydrofuran or dibutyl ether.

Preferably the reaction mixture is carried out in the presence of alkaline substances. Such adjuvants enhance the selectivity of the stereochemical course of the reduction and hence reduce the formation of by-products. The basic adjuvants can be organic bases, such as pyridine, quinoline or dimethylaniline; inorganic alkalis, such as caustic soda, sodium bicarbonate, soda ash, sodium acetate, calcium hydroxide, barium oxide or mixtures of these bases. When these basic materials are employed, obviously the reaction must be watched to prevent hydrolysis of a reactive group, such as a 21-acyloxy moiety. In this case, anhydrous media or inorganic bases may be employed. Often the 21-hydroxy analogue is desired. In this case simultaneous reduction at 3 and hydrolysis at 21 may be purposely carried out.

The 21-acyloxy compounds are also readily prepared by first preparing $11\beta,12\beta$-epoxypregnane-$3\alpha$-ol-20-one by the above described method. This compound is treated with a halogen acid, preferably hydrogen bromide, in either aqueous alcohol, such as aqueous methanol, and other organic solvents, such as dioxane or chloroform, to open the 11,12-epoxide ring. The 12-bromo-11-ol is brominated at 21 with bromine in an organic solvent, such as methylene chloride, acetic acid or chloroform, preferably in the presence of a catalytic amount of hydrogen bromide. The resulting 12,21-dibromopregnane-$3\alpha$,11-diol-20-one is reacted with an alkali metal salt such as the sodium or potassium salt of the desired acyloxy moiety which is to be inserted into position 21 in a water-miscible organic solvent inert under the reaction conditions, such as acetone or methyl ethyl ketone, preferably an additional alkali metal salt, such as sodium bicarbonate or potassium carbonate, is added to the reaction mixture to insure complete reaction, i.e., both inserting the 21-acyloxy group and reforming the 11,12-epoxy ring. As an example of this step of the process, the reaction is carried out using potassium acetate and sodium bicarbonate in acetone at reflux to give the 21-acetoxy analogue, $11\beta,12\beta$-epoxy-pregnane-$3\alpha$,21-diol-20-one 21-acetate. Alternatively, these two reactions may be carried out separately, for instance insertion of the 21-acyloxy moiety and then closing the 11,12-epoxy ring.

The 21-esters may be further esterified at the 3-position to form diesters with an acyl chloride or anhydride, in an excess of tertiary organic base, preferably pyridine, or in an inert organic liquid with a smaller amount of base, for instance in ethyl acetate or dimethylformamide with one to five equivalents of pyridine or tributylamine. This method is particularly useful to prepare mixed diesters.

Another means of synthesis of compounds of this invention is mild hydrolysis of the 21-esters prepared as above. For instance, the 21-acyloxy compound is reacted with dilute methanolic potassium hydroxide or a catalytic amount of sodium methoxide in methanol solution to form the 21-hydroxy analogue, which can be diacylated under conditions described immediately above to form the 3,21-diacylates.

Mixed esters can be obtained alternatively by selectively reducing under nonhydrolytic conditions the 3-keto moiety of $11\beta,12\beta$-epoxypregnane-3,20-dione-21-ol acylates which are described in our copending application Serial No. 647,465 filed March 21, 1957. The resulting $11\beta,12\beta$-epoxypregnane-$3\alpha$,21-diol-20-one 21-acylates are then optionally acylated at the 3-hydroxy position with an acyl chloride or anhydride, in an excess of tertiary organic base, preferably pyridine, or in an inert organic liquid with a smaller amount of base, for instance in ethyl acetate or dimethylformamide with one to five equivalents of pyridine or tributylamine.

The $11\alpha,12\alpha$-epoxypregnane-$3\alpha$-ol-20-ones of this invention are prepared advantageously by reacting the $\Delta^{11}$-pregnene analogue (prepared as described by Wettstein and Schmidlin, U.S. Patent No. 2,782,211), with a peracid, for instance perbenzoic, or preferably perphthalic acid, in a suitable organic solvent, for instance ether, benzene or toluene to form $11\alpha,12\alpha$-epoxypregnane-3,20-dione. The selective reduction of the 3-one moiety of the $11\alpha,12\alpha$-epoxides and the other preparative routes described above are fully applicable to the preparation of these analogues.

A group of mono- and diacylates have been described for modifying the 3,21-hydroxyl groups. In practice, any acyl substituted compound which has activity as such or upon hydrolysis of the acyl group to the active hydroxylated compound in vivo can be used. Illustrative of such acylates are oleate, palmitate, isobutyrate, stearate, benzoate, hemiphthalate, nicotinate, $\beta$-naphthoate, glycolate, cyclopentylproprionate, phenylacetate, hemimaleate and preferably acetate, hemisuccinate or sodiohemisuccinate esters.

The following examples will serve to illustrate the preparation of the novel compounds as well as variations of the processes of this invention. The scope of this invention is not to be limited by these examples since it will be obvious to one skilled in the art that these examples are merely illustrative of this invention and that modifications thereof are possible.

*Example 1*

A solution of 50.0 g. of $11\beta, 12\beta$-epoxypregnane-3,20-dione in 800 cc. of methanol is cooled to 15° C. and a solution consisting of 2.0 g. of sodium borohydride, 15 cc. of 10% aqueous caustic soda, 100 cc. of pyridine and 100 cc. of methanol is added. During the addition, the temperature of the mixture rises to 30° C. and then gradually drops to about 20° C. The mass is agitated for about 20 minutes. Thereafter the mass is made strongly acidic by the addition of 4 N hydrobromic acid (about 400 cc.) and 100 cc. of water. The mixture is agitated until crystallization commences. Then water (400 cc.) is added slowly over a one-half hour period. The slurry is cooled to 15° C. and then filtered. The filter cake is washed with 250 cc. of 50% aqueous methanol; the washed cake then is dried. The dried product, 12-bromopregnane-$3\alpha$,11-diol-20-one (48.0 g.), melts at 188° to 190° C.

The bromohydrin (48.0 g.) is stirred in 1600 cc. of methylene chloride and 2.5 cc. of methanol is added. A solution of 19.0 g. of bromine in 250 cc. of methylene chloride is added gradually for 15 minutes, until the color of bromine persists. The mass is then washed with successive portions of water, aqueous sodium bicarbonate and water. The washed solution is concentrated to a volume of about 500 cc., cooled and filtered. The filter cake, after washing with cold methylene chloride and drying, weighs 42.2 g. and melts at 185° to 187° C.

A mixture consisting of 42.0 g. of 12,21-dibromopregnane-$3\alpha$,11-diol-20-one in 600 cc. of acetone, 110.0 g. of potassium acetate and 8.7 g. of sodium bicarbonate, added in increments of 1.45 g. at 15 minute intervals, is heated under reflux for five hours. Thereafter the mass is distilled to remove acetone; the last traces being distilled in vacuo. The residue is taken up in either. The ether solution, washed with water, is evaporated to dryness. The residue is dissolved in absolute ether and then concentrated to incipient crystallization. In this manner, 24.2 g. of $11\beta,12\beta$-epoxypregnane-$3\alpha$,21-diol-20-one 21-acetate, M.P. 158° to 162° C., is obtained. On concentration of the mother liquor, a second crop amounting to 1.38 g. (M.P. 154° to 157° C.) is isolated.

Treatment of the 21-acetoxy compound (500 mg.) with 50 cc. of dilute methanolic potassium hydroxide results upon cooling and evaporation, in the formation of 11β, 12β-epoxypregnane-3α,21-diol-20-one.

Example II

A slurry of 5.0 g. of 11β,12β-epoxypregnane-3,20-dione in 80 cc. of methanol is warmed gently to complete solution and thereafter agitated while cooling to 25° C. A solution of 200 mg. of sodium borohydride in 10 cc. of pyridine, 10 cc. of methanol and 1.5 cc. of 10% aqueous caustic soda is added to the slurry. After the addition, the solid dissolves completely and the temperature rises to 34° C. The mass is agitated for 15 minutes, during which time the temperature falls to 30° C. To this mass is added 500 cc. of water in five equal portions and the resultant slurry is agitated for one hour. The mixture is filtered and the filter cake is washed with water. After drying, 4.21 g. of product, 11β,12β-epoxypregnane-3α-ol-20-one, (M.P. 130–140° C.) is recovered.

The crude product is dissolved in 30 cc. of methanol and the solution concentrated to a volume of 15 cc. Upon the addition of 5 cc. of 4 N hydrobromic acid, and cooling, the bromohydrin crystallizes. This product, on titrating with methanolic caustic soda to a permanent end point with phenolphthalein and then watering out of solution, gives 11β,12β-epoxypregnane-3α-ol-20-one, M.P. 144–146° C.

A mixture of 850 mg. of the crude epoxypregnanolone, 1.5 cc. of pyridine and 1 cc. of acetic anhydride is heated on a steam bath for one-half hour and then agitated for one-half hour. The mass is diluted with water and extracted with ether. The ether extract is washed with water, aqueous caustic soda and finally with water. The washed solution is concentrated to a low volume. The product crystallizes from ether-petroleum ether. The crystal slurry is filtered and the cake washed with 50/50 ether-petroleum ether, resulting in 11β,12β-epoxypregnane-3α-ol-20-one acetate, M.P. 158–160° C.

Treatment of this product, after dissolving in acetone, with 4 N hydrobromic acid yields the corresponding bromohydrin, M.P. 196–198° C.

Example III

A suspension of 2.5 g. of 11α,12α-epoxypregnane-3,20-dione, prepared by reacting Δ¹¹-pregnene-3,20-dione with monoperthalic acid in ether, in 50 cc. of ethanol is reacted with 100 mg. of sodium borohydride as in Example II to give 11α,12α-epoxypregnane-3α-ol-20-one. The crude epoxide (1.8 g.) is reacted with isocaproyl chloride (2.5 cc.) in 25 ml. of ethyl acetate and 1 ml. of pyridine at room temperature for several hours. The reaction mixture is evaporated at the water pump, washed with water and extracted into ether. The ether extracts are washed with water, dilute carbonate and dried. After reducing the volume, petroleum ether is added. Cooling separates crystals of 11α,12α-epoxypregnane-3α-ol-20-one isocaproate.

Example IV

A solution of 1.0 g. of 11β,12β-epoxypregnane-3α,21-diol-20-one in 50 cc. of acetone with 1 cc. of pyridine and 1.0 g. of succinic anhydride is stirred for eight hours. The reaction mixture is quenched in ice water and filtered. The resulting solid is 11β,12β-epoxypregnane-3α-21-diol-20-one dihemisuccinate.

A small amount (500 mg.) of the diester in purified dioxane (25 ml.) is treated with an excess of sodium metal to separate the disodium salt. The potassium salt is prepared in like manner using an excess of potassium metal.

Example V

A solution of 6.2 g. of 11β,12β-epoxypregnane-3,20-dione-21-ol propionate in 100 cc. of methanol is reacted with 600 mg. of sodium borohydride in 15 cc. of pyridine and 15 cc. of methanol. The temperature is maintained in an ice bath. The reduction mixture is quenched in ice-water after 5 minutes reaction time. Filtration gives crude 11β,12β-epoxypregnane-3α-21-diol-20-one 21-propionate.

A solution of 2.5 g. of the 21-propionate in 30 cc. of pyridine is reacted with 1 g. of benzoyl chloride. After standing at room temperature overnight, the reaction mixture is quenched in water and filtered. The dried solid product, 11β,12β-epoxypregnane-3α,21-diol-20-one 3-benzoate 21-propionate, is recrystallized from methanol-petroleum ether.

Example VI

A solution of 2.0 g. of 11β,12β-epoxypregnane-3α,21-diol-20-one in 25 ml. of dry pyridine is reacted with 2 cc. of acetic anhydride as described in Example II to give 11β,12β-epoxypregnane-3α,21-diol-20-one diacetate.

Example VII

A suspension of 4.8 g. of 11β,12β-epoxypregnane-21-ol-3,20-dione hemisuccinate in 100 cc. of methanol and 25 cc. of water is reacted with 100 mg. of sodium borohydride in the presence of 25 ml. of tributylamine. The reaction mixture, after one hour, is evaporated in vacuo. The residue is diluted with water, carefully neutralized with dilute acetic acid and extracted with ether and ethyl acetate. The organic extracts are washed with water. Concentration and trituration with isooctane gives 11β,12β-epoxypregnane-3α,21-diol-20-one 21-hemisuccinate. A solution of this ester (0.1 g.) in 500 ml. of ether is reacted with potassium metal to give the potassium salt. A solution of this ester (0.1 g.) in 500 ml. of ether is reacted with sodium metal to give the sodium salt.

Example VIII

A mixture of 10.5 g. of 12,21-dibromopregnane-3α,11-diol-20-one prepared as in Example I, in 200 ml. of acetone is reacted as in Example I, using sodium benzoate rather than potassium acetate. The product obtained as above is 11β,12β-epoxypregnane-3α,21-diol-20-one 21-benzoate.

A mixture of 1.0 g. of the benzoate, 2.0 cc. of pyridine and 1 ml. of butyric anhydride is allowed to stand at room temperature for two hours. The reaction mixture is quenched with water and extracted with ether. The washed and dried ether extracts are concentrated to give crystals of the desired 3-butyrate 21-benzoate ester.

Example IX

A solution of 500 mg. of 11β,12β-epoxypregnane-3α,21-diol-20-one, prepared as in Example I, in 50 cc. of acetone with 0.5 ml. of pyridine is stirred overnight with 0.6 g. of glutaric anhydride. After quenching the reaction mixture in an ice slurry, the solid is separated by filtration to give 11β,12β-epoxypregnane-3α,21-diol-20-one dihemiglutarate.

A small amount of this solid is dissolved in ether and reacted with a kernel of sodium to give the solid disodium salt.

Example X

A mixture of 5.2 g. of 12,21-dibromopregnane-3α,11-diol-20-one, prepared as in Example I, in 100 ml. of acetone is reacted and worked up as in Example I, but using 11.5 g. of potassium caproate rather than potassium acetate. The product obtained from the reaction mixture is 11β,12β-epoxypregnane-3α,21-diol-20-one 21-caproate.

A solution of 500 mg. of this ester is dissolved in ether with a few drops of pyridine. About 300 mg. of succinic anhydride in ether is added at reflux. The ether is removed and the residue quenched in water to yield the solid 3-hemisuccinate 21-caproate salt.

What is claimed is:

1. A chemical compound having the following formula:

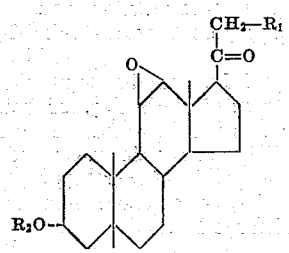

in which $R_1$ is a member selected from the group consisting of hydrogen, hydroxyl, alkanoyloxy having 2 to 6 carbon atoms, ω-carboxyalkanoyloxy having 4 to 6 carbon atoms, alkali metal salts of ω-carboxyalkanoyloxy moieties having 4 to 6 carbon atoms, and benzoyloxy; $R_2$ is a member selected from the group consisting of hydrogen, alkanoyl having 2 to 6 carbon atoms, benzoyl, ω-carboxylalkanoyl having 4 to 6 carbon atoms, alkali metal salts of ω-carboxyalkanoyl moieties having 4 to 6 carbon atoms.

2. 11β,12β-epoxypregnane-3α,21-diol-20-one.
3. 11β,12β-epoxypregnane-3α-ol-20-one.
4. 11β,12β-epoxy-21-hemisuccinyloxypregnane-3α-ol-20-one.
5. 11β,12β-epoxy-21-sodiohemisuccinyloxypregnane-3α-ol-20-one.
6. 21-acetoxy-11β,12β-epoxypregnane-3α-ol-20-one.
7. 11α,12α-epoxypregnane-3α-ol-20-one.

References Cited in the file of this patent
UNITED STATES PATENTS

| | | |
|---|---|---|
| 2,314,185 | Zondek | Mar. 16, 1943 |
| 2,776,302 | Ruzicka et al. | Jan. 1, 1957 |
| 2,910,471 | Jones et al. | Oct. 27, 1959 |

OTHER REFERENCES

"Chemistry and Industry," 1954, by Woods et al., pages 518–519 relied on.